Nov. 7, 1933.	H. J. HOGUE	1,934,466
COMBINED WIRE DRAWING AND FABRICATING MACHINE
Filed April 13, 1933	5 Sheets-Sheet 1

INVENTOR:
HENRY J. HOGUE
ATTORNEYS

Nov. 7, 1933.  H. J. HOGUE  1,934,466
COMBINED WIRE DRAWING AND FABRICATING MACHINE
Filed April 13, 1933   5 Sheets-Sheet 2

INVENTOR:
HENRY J. HOGUE
Kwis Hudson & Kent
ATTORNEYS

Nov. 7, 1933.  H. J. HOGUE  1,934,466
COMBINED WIRE DRAWING AND FABRICATING MACHINE
Filed April 13, 1933   5 Sheets-Sheet 3

INVENTOR:
HENRY J. HOGUE
Kwis Hudson & Kent
ATTORNEYS

Nov. 7, 1933.   H. J. HOGUE   1,934,466
COMBINED WIRE DRAWING AND FABRICATING MACHINE
Filed April 13, 1933   5 Sheets-Sheet 4

INVENTOR:
HENRY T. HOGUE
Kwin Hudson & Kent
ATTORNEYS

Nov. 7, 1933.    H. J. HOGUE    1,934,466
COMBINED WIRE DRAWING AND FABRICATING MACHINE
Filed April 13, 1933    5 Sheets-Sheet 5
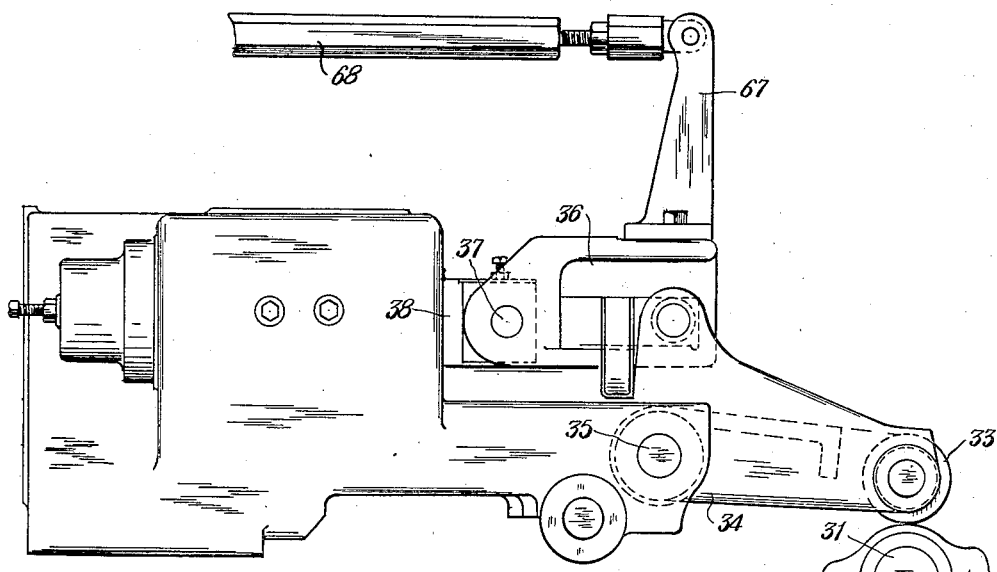
FIG. 6
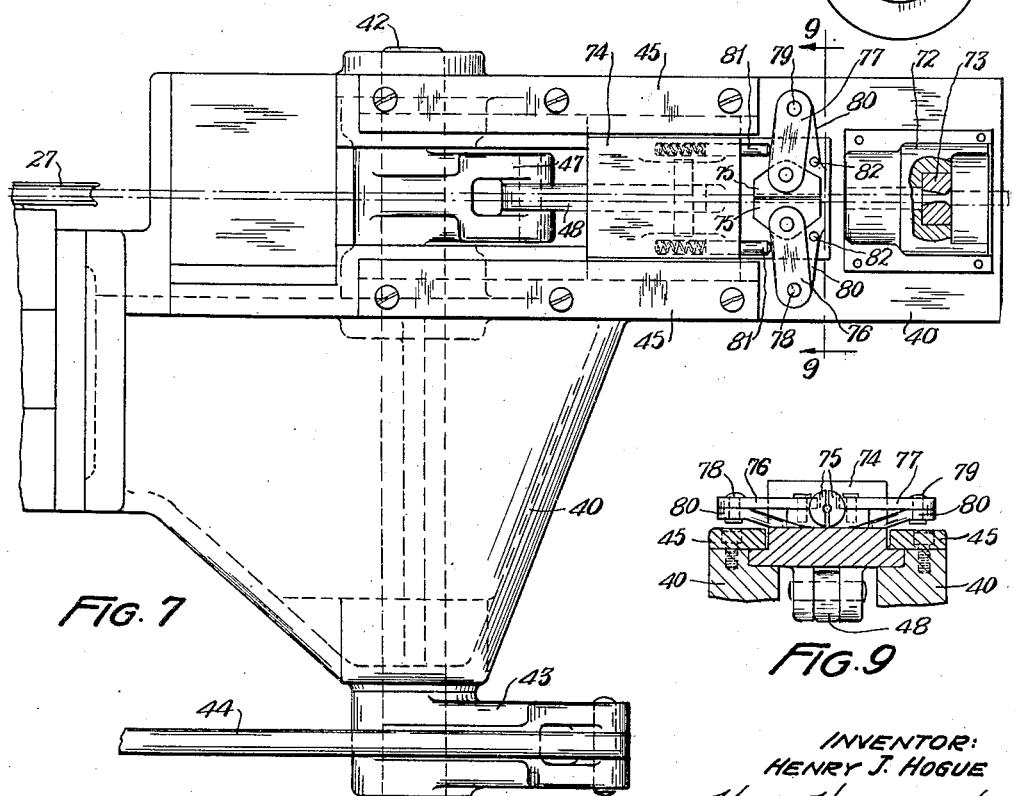
FIG. 7
FIG. 9
INVENTOR:
HENRY J. HOGUE
ATTORNEYS Patented Nov. 7, 1933

1,934,466

UNITED STATES PATENT OFFICE 1,934,466

COMBINED WIRE DRAWING AND FABRICATING MACHINE

Henry J. Hogue, Lakewood, Ohio, assignor of one-third to Charles L. Wasmer and one-third to John C. Wasmer, both of Lakewood, Ohio Application April 13, 1933. Serial No. 665,912

13 Claims. (Cl. 29—33)

This invention relates to apparatus for making screws and bolts and, more particularly, to a machine for cold-drawing the wire stock and cutting the same into lengths to form blanks and then heading these blanks.

It is one of the objects of the invention to provide a machine that will take hot-rolled rod stock and accurately size the rod as to diameter and produce screw and bolt blanks that will be, in every respect, equal to blanks as now commonly manufactured from cold-drawn wire stock.

It is the further object of the invention to provide a machine of the kind referred to that will be simple in construction, convenient to operate, and efficient and durable.

Other objects of the invention and the features of novelty will be apparent from the following description taken in connection with the accompanying drawings, of which Fig. 1 is a side elevation of an apparatus embodying one form of my invention;

Fig. 6 is a detail elevation of certain parts which appear in Fig. 2;

Fig. 7 is a plan view of a modified form of the wire drawing portion of the apparatus;

Fig. 8 is a detail section on the line 8—8 of Fig. 2;

Fig. 9 is a section on the line 9—9 of Fig. 7, and

Figure 1:
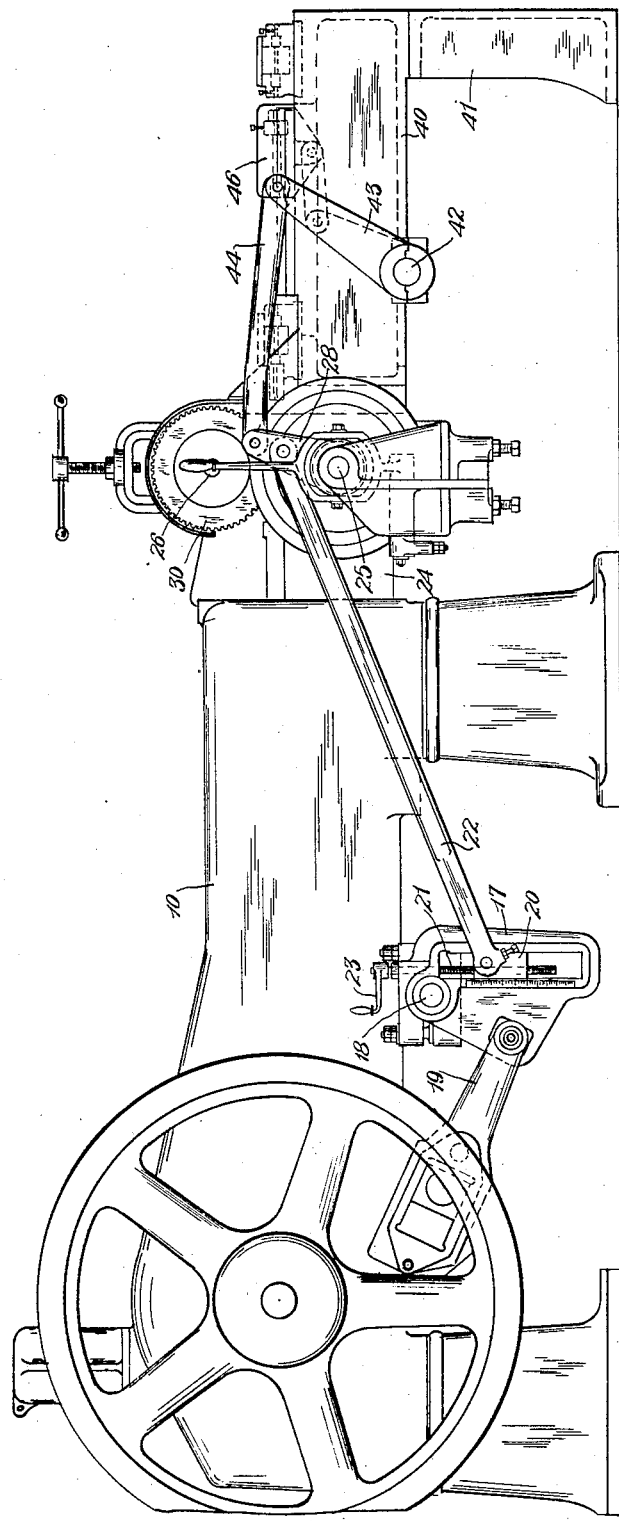

Referring to the drawings, 10 indicates the main frame of a common form of bolt heading machine that is in commercial use. This machine has a main shaft 11 on which there are the fly wheels 12, one of which may be used as the driving pulley of the machine. The shaft 10 is provided with a crank 13 which is connected with a cross-head 14 by a suitable connecting rod (not shown). The cross-head 14 carries the heading die 15 which is adapted to form a head on a blank which is held by the jaws 16.

A yoke arm 17 is fulcrumed on a shaft 18 and has connected therewith a rod 19 which is moved by suitable mechanism (not shown) to rock the arm 17 about the axis of the shaft 18. A block 20 is mounted on an adjusting screw 21, in the yoke arm 17, and a connecting rod 22 is pivotally connected with the block 20. By rotating the screw 21, by means of the crank 23, the block 20 may be moved toward or away from the shaft 18 to thereby decrease or increase the stroke of the rod 22.

An extension 24, on the frame 10, carries the shafts 25 and 26 on which a pair of stock feed rolls 27 are mounted. Oscillatably arranged on the shaft 25 is an arm 28 to which the rod 22 is connected, so that this arm is caused to oscillate by the yoke arm 17. A one-way clutch device 29, shown in Fig. 8, is adapted to form a driving connection between the hub of the arm 28 and the shaft 25 so that the shaft, with its feed roll, will be caused to be intermittently rotated by the oscillation of the arm 28. The shaft 26 is driven from the shaft 25 by a pair of gear wheels, one of which is illustrated at 30 in Fig. 1.

The frame 10 carries a cam shaft 31 which is suitably driven by mechanism not shown and carries a cam 32 with which a roller 33 on a lever arm 34 cooperates. The arm 34 is pivoted at 35 on the frame of the machine and is operatively connected with a member 36 which is pivoted at 37 to a slide 38 and this slide, in turn, actuates a toggle mechanism 39 which controls the stock cutting mechanism and the jaws 16, for severing the blank from the rod and holding it for the heading operation.

All of the mechanism so far described is well known to those skilled in the art and, therefore, a detailed description of all of the parts of this mechanism by which the various functions are performed, has not been deemed necessary.

In the operation of this part of the apparatus, the stock is fed intermittently, by the feed rolls 27, into the jaws 16 and against a suitable stop (not shown). The blank is then cut off and moved laterally by the jaws 16 into alignment with the heading die 15, which then strikes the end of the blank and forms the head thereon. Upon the completion of the heading operation, the stock is again moved forward and the cycle of operations repeated so that, in the normal operation of the machine, the stock moves intermittently and, while it is at rest, the blank is cut off and the head formed thereon.

I have described the main features of the heading mechanism and the operation thereof in order that the wire drawing mechanism, which will now be described, and its connection with the various features of the heading mechanism, may be understood.

In providing the wire drawing mechanism, I attach a bed 40 to the frame extension 24 and support the outer end of the bed on a pedestal 41. On the underside of the bed there is mounted, in suitable bearings, a shaft 42 carrying an operating arm 43 which is connected with the arm 28 by a rod 44.

On the upper side of the bed 40 there are ways 45 for a slide 46. A lever arm 47 is keyed or otherwise secured to the shaft 42 and is connected with the slide 46 by the rod 48 so that the oscillation of the shaft 42 will cause the slide 46 to reciprocate in the ways 45. The slide 46 has a recess at one end in which there is mounted a wire drawing die 49. This die may be secured in the recess by the set screw 50 or in any other suitable manner. A plate 51 is secured across the end of the slide 46 and there is a pocket 52 between this plate and the die 49 to receive a lubricating compound, such as is commonly used in wire-drawing.

Mounted on the bed 40 is a frame 53 which has secured in its opposite walls the aligned sleeves 54 and 55 through which the wire stock is guided into the machine. A slide 56 is arranged in the frame 53 and connected with a manually operable lever 57 by means of a toggle link 58. The slide 56 has a jaw 59 attached thereto and this jaw cooperates with a stationary jaw 60 mounted in the frame 53 so that, by closing these jaws, by means of the lever 57, the wire stock may be gripped and held against backward movement, for a purpose to be hereinafter described.

There is also mounted on the bed 40 a frame 61, similar to the frame 53, and having a slide 62 therein which is actuated by a lever 63 acting through the toggle link 64. The slide 62 carries a jaw 65 which cooperates with a stationary jaw 66, in the frame 61, to grip and hold the stock against backward movement. The lever 63 is connected with a bracket 67, on the member 36, by means of an adjustable rod 68 so that, when the member 36 is actuated by the cam 32 and lever arm 34, the jaws 65 and 66 will be automatically closed to grip the wire stock and prevent backward movement thereof. It will be noted that, on account of the member 36 actuating the blank-severing and holding means, as heretofore described, the gripping of the stock by the jaws 65 and 66 will occur simultaneously with the actuation of the blank-severing and holding means.

In the operation of the apparatus, above described, the wire stock is fed through the sleeves 54 and 55 and jaws 59 and 60, from a coil or reel, and through an opening in the plate 51 and thence through the drawing die 49 and the opening 69 in the slide 46 and the sleeves 70 and 71 and jaws 65 and 66 to the feed rolls 27. From these feed rolls the stock passes into the jaws 16 of the blank-severing and holding mechanism. In passing through the various devices, just described, the wire stock is in a straight line and will be fed forward intermittently by the feed rolls 27 which are actuated by the one-way clutch 29.

Figure 2:
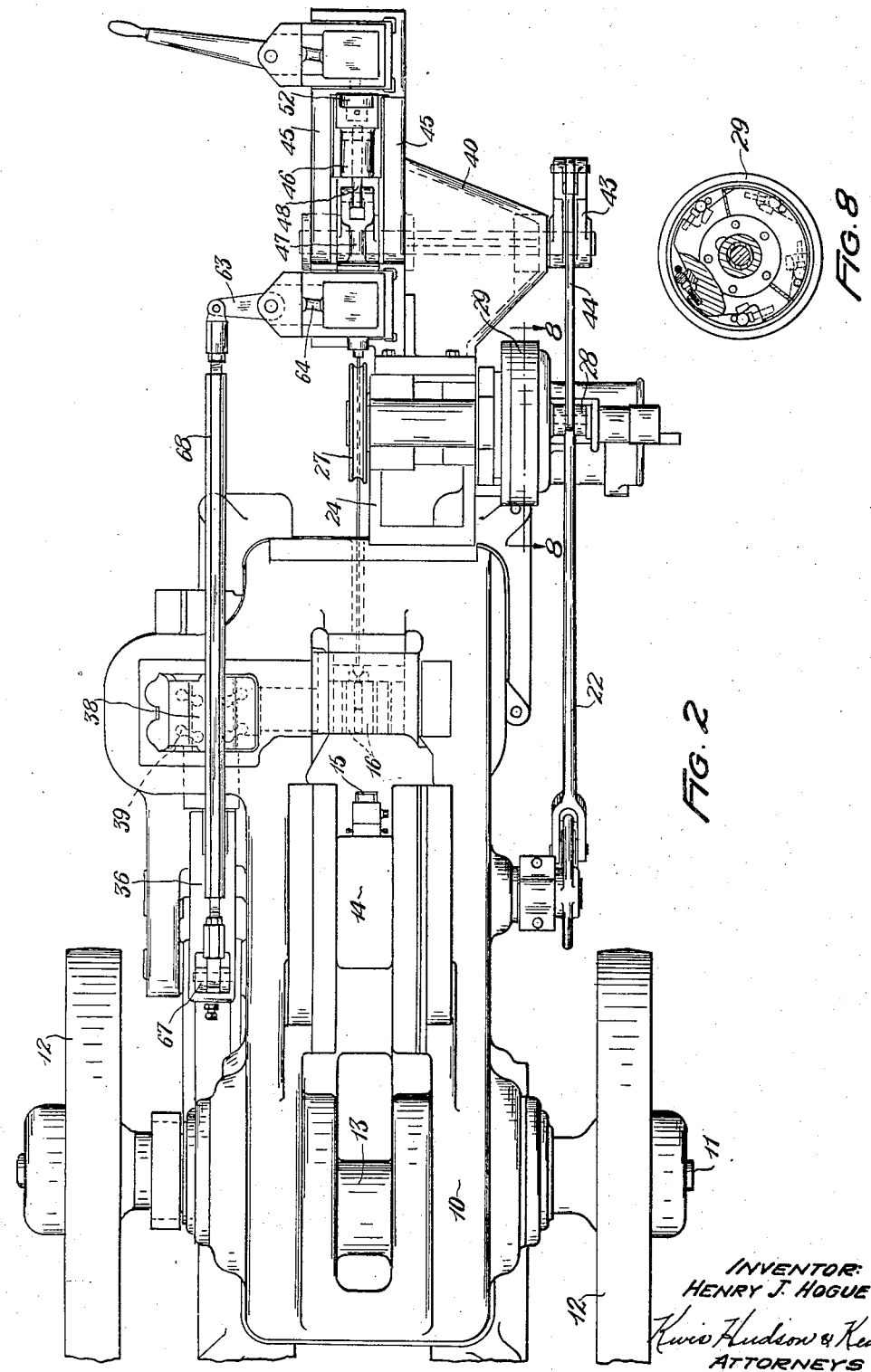
Fig. 2 is a plan view thereof.
Figure 3:
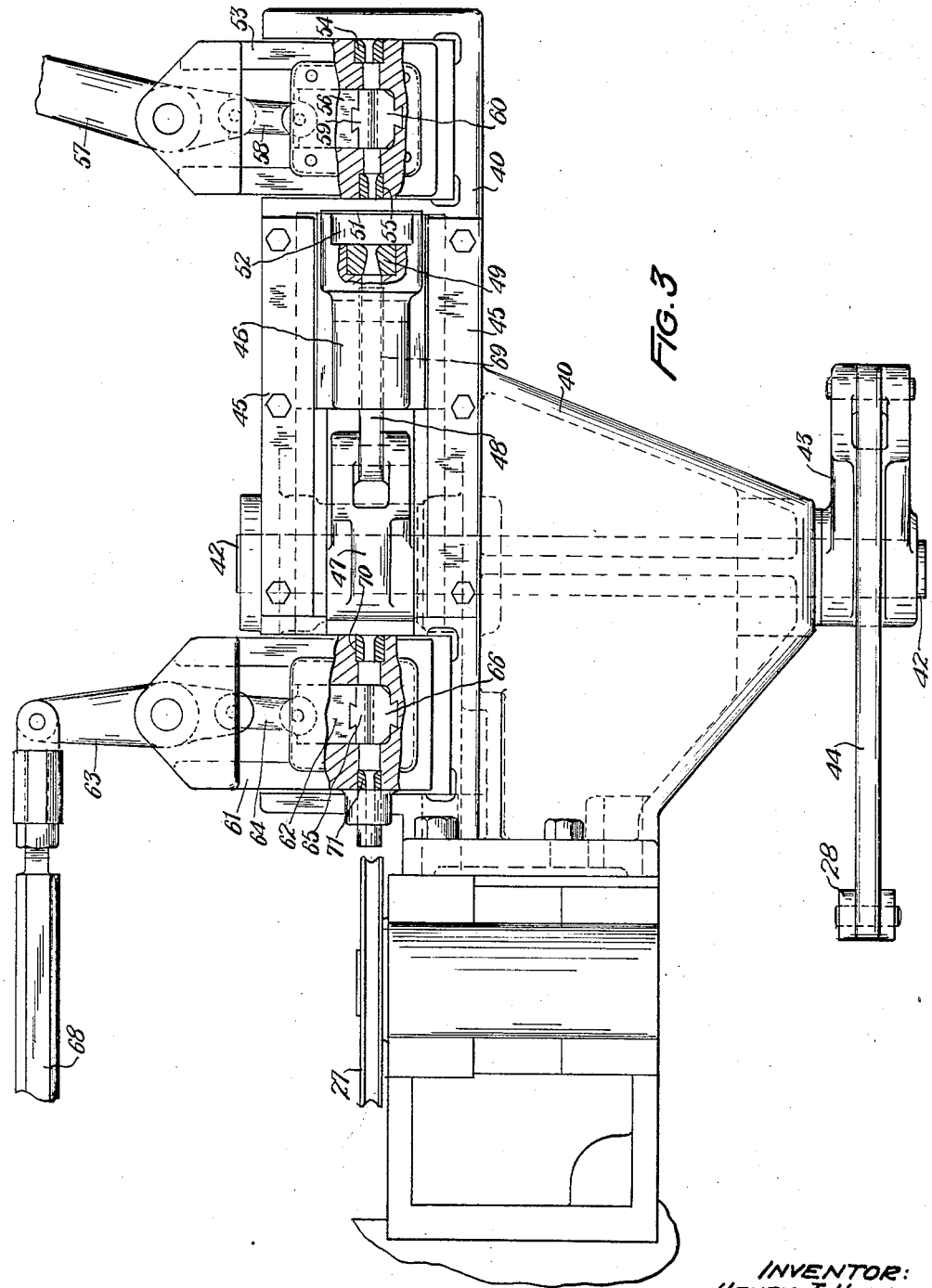
Fig. 3 is an enlargement of a portion of Fig. 2.
Figure 4:
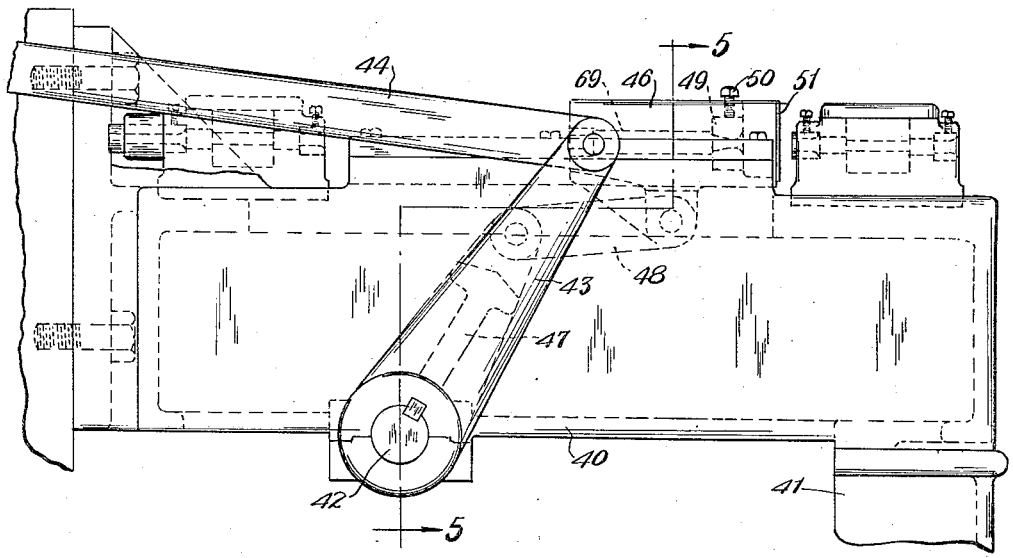
Fig. 4 is an enlargement of a portion of Fig. 1.
Figure 5:
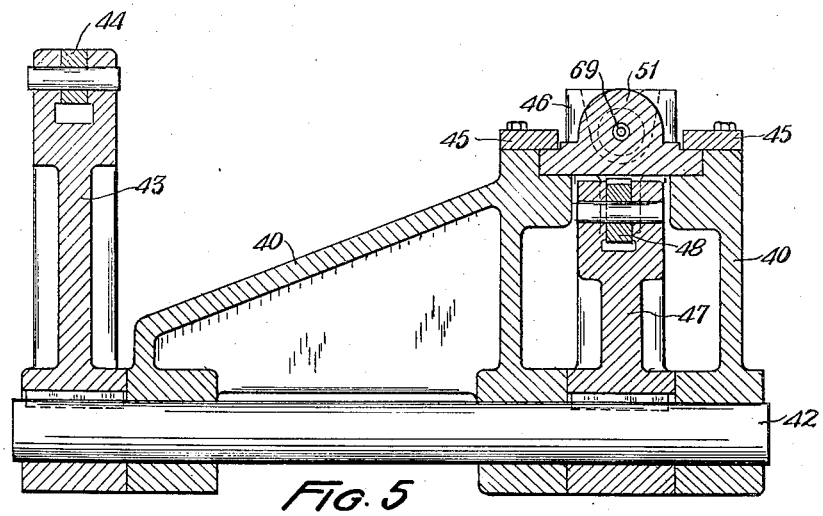
Fig. 5 is a section on the line 5—5 of Fig. 4.

The rotation of the shaft 11 causes the arm 28 to oscillate about the shaft 25 and when the arm 28 is moving toward the left, in Fig. 5, the clutch 29 will cause the rotation of the feed rolls 27 and the feeding of the stock into the jaws 16 which will then be open. On completion of the stroke of the arm 28 the cam 32 will raise the arm 34 and thus actuate the jaws 16, through the toggle mechanism 39, to grip the end portion of the stock and move it downward, in Fig. 2, to sever the blank and to bring it into alignment with the heading die 15. Simultaneously with the actuation of the jaws 16, the lever 63 will be actuated by the rod 68 to close the jaws 65 and 66 so as to thereby grip the stock and hold it against backward movement. While the arm 28 is moving to the left and the feed rolls 27 being actuated to feed the stock forward, the rod 44 is also being drawn to the left, by the arm 28, and this moves the slide 46 to the left, with the stock, because of the connection between the rod 44 and the arm 43. When the arm 28 moves to the right, in Fig. 1, the feed rolls 27 are stationary but the slide 46 is moved to the right and, since the stock is being held by the jaws 65 and 66, the die 49 will move along the stock and perform the wire-drawing operation. When the arm 28 again moves to the left, the sequence of operations will be repeated.

In order to start the wire through the machine the mechanism is first set so that the slide 46 will move to the right when the machine is started. The end of the stock is then fed through the sleeves 54 and 55 and the jaws 59 and 60, and inserted in the die 49. The lever 57 is then manually actuated to close the jaws 59 and 60 and thus grip the stock and hold it against backward movement. The machine is then started and the slide 46 moved to the right to the end of its stroke. Since the stock is held by the jaws 59 and 60 the end of the stock will be forced through the die 49 during this operation. The lever 57 is then moved to open the jaws 59 and 60 and the machine is operated to move the slide 46 to the left, to the end of its stroke, the stock being manually fed forward during this movement of the slide 46. The lever 57 is then actuated to close the jaws 59 and 60 again, and thereby hold the stock against backward movement, and the operation is repeated. By a series of operations of this kind the stock may be gradually fed forward into the feed rolls 27 and thence into the blank-severing and holding mechanism, when the machine will be ready for continuous operation and the hand lever 57 will then be set so as to hold the jaws 59 and 60 in their open position. It will thus be understood that the jaws 59 and 60 and the mechanism for actuating the same will be idle during the normal operation of the machine, and are merely for the purpose of facilitating the initial feeding in of the stock.

In the form of the invention illustrated in Figs. 7 and 9, the frame 53 with the jaws 59 and 60 and their actuating mechanism, are dispensed with and there is mounted on the bed 40 a holder 72 for a stationary wire-drawing die 73. The slide 74 carries a pair of jaws 75 which are connected with the toggle links 76 and 77. These toggle links are pivoted at 78 and 79, respectively, on the bracket-like parts 80 on the slide 74 and the spring-pressed plungers 81 engage the links 76 and 77 and tend, normally, to press these links to the right, in Fig. 7, and toward the stop pins 82.

In the operation of this form of the apparatus, the slide 74 will have the same movement as the slide 46, and when the stock is being fed forward by the feed rolls 27, as previously described, the slide 74 will be moving to the left, with the stock, and the jaws 75 will grip the stock with sufficient force to draw it through the die 73. However, on the right-hand stroke of the slide 74, the jaws 75 will freely slide along the stock, which will be held from backward movement by the feed rolls 27, and when the slide 74 again moves to the left, in Fig. 7, the stock will again be drawn through the die 73 and the cycle of operations repeated.

It will be noted that, in the form of the invention illustrated in Figs. 7 and 9, the frame 61 and the jaws 65 and 66, with their actuating mechanism, have been eliminated because, since the wire-drawing die does not operate on the backward or right-hand stroke of the slide 74, the stock will be held by the feed rolls 27 and the die 73 with sufficient force to prevent it from being moved backward by the jaws 75.

From the foregoing, it will be seen that I have provided apparatus embodying a wire-drawing mechanism and a blank-severing and heading mechanism, all operating in synchronism and so interconnected that there is no possibility of either mechanism getting out of step with the other. It will also be seen that the apparatus makes it possible to take hot-rolled rods, or wire stock, and accurately size and cold-work this stock in the wire-drawing die, and then form the bolt blanks and head the same with the same accuracy and speed of production that is now possible with the heading machine operating alone and utilizing finished wire stock.

Figure 10:
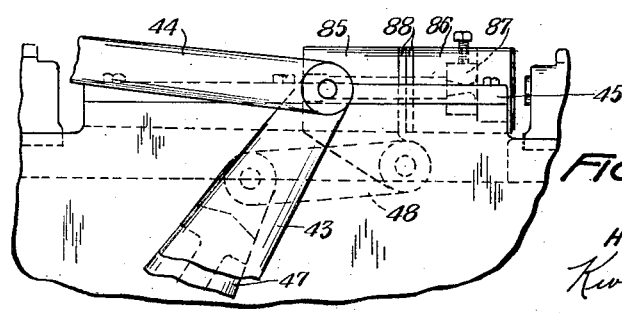
Fig. 10 is a detail longitudinal section of a modification of the slide for the wire-drawing die.

In the form of the invention illustrated in Fig. 10, the slide, corresponding to the slide 46, is made in the two parts 85 and 86, the part 85 being actuated by the link 48, and the part 86 carrying the wire-drawing die 87. Hardened steel plates 88 are provided on the abutting faces of the parts 85 and 86. The advantage of this construction is that the stroke of the part 85 does not have to be accurately adjusted to correspond with the stock-feeding movement of the rolls 27. The stroke of the part 85 is made greater than the stock feed and when the part 85 is moving in the direction of stock feed it will move away from the part 86 which will be moved forward by the wire. At the end of its forward stroke the part 85 will be separated from the part 86 and on its return stroke it will first move into engagement with the part 86 and then the two parts will move together, as a unit for a distance equal to the length of the stock-feed.

It will be evident that, in the construction illustrated in Fig. 10, the parts 85 and 86, perform the function of the single slide 46 of the other construction and are the equivalent thereof, but by making the slide in two parts there are additional advantages, not present in the one-piece construction, as described.

While I have illustrated and described what I now consider to be the preferred embodiments of my invention, it will be understood that various changes may be made in the details that have been described and illustrated, without departing from the spirit of the invention as defined in the appended claims.

Having thus described my invention, I claim:

1. In apparatus of the class described, the combination of a heading mechanism, a stationary wire-drawing die, a plurality of intermittently operating devices for feeding the stock in said mechanisms, and a single means for actuating said devices simultaneously.

2. In apparatus of the class described, the combination of a heading mechanism, a wire-drawing mechanism, a pair of stock-feeding rolls, a reciprocating device for gripping and feeding the stock, and means common to said rolls and said device for actuating them in synchronism.

3. In apparatus of the class described, the combination of a heading mechanism, a wire-drawing mechanism, a pair of stock-feeding rolls, a reciprocating device for gripping and feeding the stock, an oscillatable arm, and means for operatively connecting said arm with said rolls and said device so that said rolls and said device are simultaneously actuated to feed the stock when said arm moves in one direction.

4. In apparatus of the class described, the combination of a heading machine comprising blank-cutting and gripping mechanism, means for actuating said mechanism, a reciprocable member carrying a wire-drawing die for the stock, a fixed stock gripping device to prevent backward movement of the stock, connecting means between the first mentioned means and said device for operating the latter to grip the stock simultaneously with the actuation of said mechanism, and means for actuating said member while the stock is held by said device.

5. In apparatus of the class described, the combination of a heading machine comprising blank-cutting and gripping mechanism, means for actuating said mechanism, a reciprocable member carrying a wire-drawing die for the stock, a fixed stock gripping device to prevent backward movement of the stock, connecting means between the first mentioned means and said device for operating the latter to grip the stock simultaneously with the actuation of said mechanism, a pair of stock-feeding rolls, an oscillatable arm, means connecting said arm with said member and whereby the latter is reciprocated, and a one-way clutch for operatively connecting said arm with said rolls to intermittently actuate the latter.

6. In apparatus of the class described, the combination of a heading machine, a pair of stock-feeding rolls, a reciprocable member carrying a wire-drawing die for the stock, means for holding the stock against backward movement, an oscillatable arm, connecting between said arm and said member and whereby the latter is reciprocated, and a one-way clutch for operatively connecting said arm with said rolls to intermittently actuate the latter.

7. In apparatus of the class described, the combination of a heading machine, a pair of stock-feeding rolls, a wire-drawing die, a reciprocable member for effecting relative movement between the stock and said die during the wire-drawing operation, an oscillatable arm, connecting means between said arm and said member and whereby the latter is reciprocated, and a one-way clutch for operatively connecting said arm with said rolls to intermittently actuate the latter.

8. In apparatus of the class described, the combination of a heading machine, a pair of stock-feeding rolls, a wire-drawing die, a reciprocable member for effecting relative movement between the stock and said die during the wire-drawing operation, an operating member, connecting means between said operating member and said reciprocable member whereby the latter is actuated, and a one-way clutch for operatively connecting said operating member with said rolls to intermittently actuate the latter.

9. In apparatus of the class described, the combination of a heading mechanism, stock-feeding means, a reciprocable wire-drawing die, fixed stock-gripping means between said mechanism and said die, and manually operable stock-gripping means on the opposite side of said die from the first-mentioned stock-gripping means.

10. In apparatus of the class described, the combination of a wire-drawing die mechanism independent of said die for intermittently feeding wire stock and severing blanks therefrom, means for gripping the stock and holding it from backward movement while said feeding mechanism is idle, and means for moving said die along the stock to effect the wire-drawing operation while the stock is held by said gripping means.

11. In apparatus of the class described, the combination of mechanism for intermittently feeding wire stock and severing blanks therefrom, two reciprocating relatively movable slides, one of said slides carrying a wire-drawing die and being actuated in one direction by the stock and in the opposite direction by the other of said slides, means for gripping the stock and holding it from backward movement while said feeding mechanism is idle, and means for reciprocating said other slide.

12. In apparatus of the class described, the combination of mechanism for intermittently feeding wire stock and severing blanks therefrom, two reciprocating relatively movable slides, one of said slides carrying a wire-drawing die and being actuated in one direction by the stock and in the opposite direction by the other of said slides, means for gripping the stock and holding it from backward movement while said feeding mechanism is idle, and means actuating said other slide so that the length of its stroke will be greater than that of the die-carrying slide.

13. In apparatus of the class described, the combination of a heading mechanism, stock-feeding means, a reciprocable wire-drawing die, fixed stock-gripping means between said mechanism and said die, and stock-gripping means on the opposite side of said die from the first mentioned stock-gripping means for gripping and holding the stock prior to its entrance into the die.

HENRY J. HOGUE.